Patented May 21, 1940

2,201,820

UNITED STATES PATENT OFFICE 2,201,820

CHOCOLATE PRODUCT

Paul T. Zizinia, Belmar, and Thomas L. McKenna, Newark, N. J.

No Drawing. Application December 24, 1937, Serial No. 181,600

10 Claims. (Cl. 99—23)

This invention relates to chocolate products and has particular reference to a readily wettable and substantially non-caking chocolate powder and to methods of producing it.

Commercial chocolate as known to the trade is usually marketed in the form of solidified cakes made by first roasting and then grinding the cacao beans to an oily mass, which contains approximately 55% of cocoa-butter and 45% cocoa fiber dispersed in the cocoa-butter. To improve the texture, the grinding is continued until the cocoa fiber is ground to a very fine degree and this mass, with which sugar or other flavoring may or may not be incorporated, is then poured into molds and allowed to solidify; the resulting cake is the chocolate of commerce and is frequently called "chocolate liquor." In this solidified form, the predominating cocoa-butter, in which the finely-ground cocoa-fiber is imbedded, renders the chocolate water-repellant, and therefore the common practice in using cake chocolate is to melt it, i. e., melt the cocoa-butter, either in a suitable heated container or in hot water. This melting is a necesary preliminary step to the use of cake chocolate in syrups, confections, cakes, etc.

In order to provide the chocolate in a more usable form it is frequently subdivided, as by grinding; also molten chocolate has ben sprayed into cold air and thereby individual chocolate particles have been obtained. In whichever way the chocolate is provided for use, whether in cake form, ground, sprayed, or the like, the finely-ground cocoa fiber is always imbedded in the larger proportion of solidified cocoa-butter and the cocoa-butter predominates on the exterior surface, so that the chocolate remains water-repellant, will not melt or disintegrate in cold water, cold milk, etc., and cannot be readily used in dry mixes; further, the melting point of cocoa-butter being low, approximately 90° F., the subdivided chocolate particles will readily melt, agglomerate and recake at temperatures slightly above normal and the object sought by the subdivision is defeated.

The purpose of this invention is to produce chocolate in a new and improved physical form, i. e., in the form of a powder, which is readily miscible with and wettable by cold water, cold milk, or other liquids having a temperature below that at which ordinary chocolate melts and yet will not melt, cake or agglomerate when exposed to high atmospheric temperatures.

In the practice of the invention we use preferably the standard cake chocolate or chocolate liquor of commerce. The chocolate is melted and thoroughly mixed with sufficient water, or directly melted in hot water, to form a free-flowing suspension of the insoluble chocolate material and then this suspension or slurry is spray-dried to remove the added water from the sprayed particles, acording to the general method disclosed in Patent No. 1,609,993, issued to our associate, W. H. Dickerson, deceased.

A good emulsion of the water, cocoa-butter and cocoa-fiber is desirable and the cocoa-butter should be broken down to the smallest possible globules, and for that purpose we prefer to use a colloid mill, such as described in our Patent No. 1,885,283. To get the best results the emulsion should be dried in a spray-dryer of the type described in Zizinia Patents Nos. 1,634,640 and 1,730,048, and to retain the emulsion in the best homogeneous state up to the point of spray-drying, the operation of the colloid mill and spray-dryer should be simultaneous and continuous as described in our Patent No. 1,718,184. If the mixture contains a large proportion of sugar, the sugar in the product as spray-dried will be amorphous and not crystallized, as explained in Zizinia Patent No. 2,077,819, and the product should be treated supplementally according to the processes described in said Patent No. 2,077,-819. The spray-drying and stabilizing of the sugar content may preferably be performed in a spray-dryer and by the processes described in our copending application Serial No. 39,518, filed September 7, 1935, now Patent No. 2,154,000, dated April 11, 1939.

The resulting chocolate powder of this invention is characterized by dry, soft, globular particles which contain all of the ingredients of the original natural chocolate liquor, but which have greatly altered physical properties. Thus, the new powder is insensitive to heat in that it is not affected by atmospheric and higher temperatures and in fact does not actually melt at any temperature since it remains stable up to its decomposition or charring temperature, viz., about 300° F. It accordingly does not agglomerate or cake, as does the original chocolate, and remains substantially free-flowing at all times, so that it is much more usable than the present commercial chocolate and may be provided as a dry article of commerce or as an ingredient in dry mixes and the like. The powder is non-hygroscopic in respect to atmospheric moisture but is easily wettable by direct contact with water and disperses readily in cold water, cold milk and other cold or cool liquids. All of these characteristics definitely distinguish the powder from the original heat-sensitive, non-wettable chocolate liquor cake as well as the similarly-characterized chocolate particles produced by grinding or spraying molten chocolate liquor into cold air.

While we do not wish to limit our invention by any theoretical explanation of the novel physical characteristics of the new chocolate powder product, from certain microscopic and other observations, we believe that these characteristics are due primarily to a reversal of phase of the fat and pulp constituents in the chocolate liquor. The original commercial cake chocolate or liquor prepared from roasted and ground cacao beans may be considered to be a two-component system composed of the insoluble chocolate constituents, namely, the finely-ground cocoa fiber, dispersed when molten and imbedded when cold, in the mass of cocoa-butter. The cocoa-butter may be in solid or liquid form, depending on its temperature, but the important and characteristic condition is that in the original chocolate the cocoa-butter component is continuous and is referred to herein as the continuous phase while the cocoa-fiber constitutes the discontinuous or disperse phase. The phase relationship of the components of this system are not altered by any ordinary mechanical treatment such as subdivision, nor by simple changes of state such as melting or freezing; the cocoa-butter component invariably remains the continuous external phase with the cocoa-fiber component discontinuously imbedded therein.

If to that system, however, is added a suitable third component, e. g., water, in which the two original components are insoluble, it is possible under controlled conditions to destroy the continuity of the cocoa-butter component by dispersing it in the new component, water. The result is an emulsion in which the water has become the continuous phase and the cocoa-butter, in the form of discontinuous microscopic droplets, the disperse phase. Such emulsions are best prepared with the aid of colloid mills which, by their disruptive action, produce a particularly fine state of subdivision of the dispersed component. In order that the emulsion prepared in this manner may be stable, it is necessary that the new disperse phase, cocoa-butter, be protected from contact and coalescence by the presence of suitable peptizing or dispersing agencies. In the instant case the finely-ground, insoluble cocoa-fiber serves this purpose. If ground sufficiently fine, these cocoa-fiber particles, when exposed to the violent action of the colloid mill, arrange themselves at the interface between the dispersed microscopic droplets of cocoa-butter and the aqueous continuum, exerting a sufficient protective effect to prevent coalescence before the next or dehydration step of the process is effected.

For this dehydration step the process known as spray-drying is particularly desirable for the following reasons: The time between the colloidal dispersion of the chocolate in the water and the dehydration can be reduced to a minimum. In fact, the two operations can be made practically simultaneous as by following the teaching of the aforementioned Patent No. 1,718,184. The necessary atomizing equipment can be designed to give additional homogenizing at the moment of projecting the emulsion into the drying atmosphere, and the instantaneous desiccation of the atomized droplets of emulsion, while suspended in the drying air, prevents coalescence during dehydration and produces a uniformly-sized particle product.

All of these factors are important in preventing a disturbance of the microscopic cocoa-butter globules with their protecting coating of cocoa-fiber, so that this arrangement persists into the dried product. It will thus be seen that the final product will consist of small, independent, generally spherical particles, each particle being of the nature of an aggregate of microscopic cocoa-butter globules coated with the protective finely-ground cocoa-fiber. In effect the operation of the new process produces a phase reversal, that is to say, the cocoa-butter which was originally the continuous external phase is now the discontinuous internal phase and the particles of finely-ground cocoa-fiber, which originally had been separated from each other by the continuous film of the cocoa-butter, now approximate a continuous external layer enclosing and protecting minute globules of cocoa-butter. That this phase relationship appears to be indicated as the reverse of the original liquor may be demonstrated by rubbing the new powder product until the friction and pressure cause the imbedded oil or fatty constituent to be liberated at the outer surface of the chocolate powder particle, thus converting the dry particle into its original oily state.

Owing to this rearrangement of the original chocolate components, the new product remains dry and free-flowing under temperature conditions far above the melting point of the cocoa-butter and is thus available at all times for ready admixture with other materials in baking and other operations without the necessity of prior melting. Because of the external layer of hydrophilic substances, the new spray-dried chocolate powder wets instantly and disperses readily in water, whereas the original chocolate with its external cocoa-butter layer was water-repellant. The microscopic subdivision of the cocoa-butter persists to afford a perfect emulsion without the necessity for violent agitation when the new product is wetted in water. The protective external coating of the finely-ground cocoa-fiber delays the development of rancidity of the cocoa-butter and adds greatly to the keeping qualities of the product. The finely-divided condition of the cocoa-butter and the perfect proportioning with the other constituents of the cacao bean found in the new product increases the digestibility of the chocolate.

The following detailed description of one method of preparing the new product is illustrative of means whereby one skilled in the art can produce the new chocolate powder, but it is not to be considered as limiting its preparation to this process. Commercial chocolate liquor prepared by roasting and grinding the cacao bean in any well-known manner, is melted by stirring into water at a temperature of approximately 120° F. For this purpose an ordinary motor-driven propeller type mixer may be employed. Sufficient water must be used so that the emulsion as prepared for drying shall be sufficiently fluent to permit ready pumping and nebulizing. In most cases a final solid content in the emulsion of from 20 to 40% will be suitable. The crude emulsion so prepared is then passed through a colloid mill, preferably of the type described in said patents Nos. 1,718,184 and 1,885,283. With this type of colloid mill a particularly uniform and fine subdivision of the fat particles can be obtained if the spacing of the coating surfaces and the rate of feed are under the control of a skilled operator. It is desired that the fat component of the chocolate be reduced in this operation to globules no larger than approximately 10 microns and preferably much smaller.

In some cases, depending upon the grade of the chocolate used and the character of any added material, it may be desirable to add an additional protective colloid to lessen the tendency toward coalescence of the dispersed fat globules. For this purpose we have found lecithin or agar in the proportion of about ¼ of 1% of the chocolate to be suitable. The dehydration of the dispersion so prepared may be conducted in any suitable manner which will prevent the recombining of the fat particles, but the process known as spray-drying is much preferred for the reasons previously set forth.

Further, although the production of a non-caking chocolate powder from commercial cake chocolate or liquor is principally comprehended by this invention, nevertheless other materials, such as milk, flavoring, sugars, and/or salts, and the like, may be added to the chocolate in considerable amounts without altering the predominating characteristics of the spray-dried product.

Although we prefer to use a colloid mill for emulsifying the insoluble constituents of the chocolate with the water prior to drying, nevertheless, any other suitable mixer or homogenizer may be used for that purpose. Though we prefer to perform the drying operation by the spray-drying method whereby the chocolate powder is recovered in separate, individual, globular particles, each particle of which contains a distributed proportion of the ingredients, with the dried cocoa-fiber positioned externally to the cocoa-butter, nevertheless, having obtained a good emulsion of the cocoa-butter with the water and a good dispersion of the cocoa-fiber therein, the product can be dried by other means. The resulting product, however, is not so desirable as our spray-dried chocolate powder.

Although this invention primarily comprehends the conversion of standard commercial cake chocolate into an improved physical form, the same principles applied to any high oil-containing or fat-containing matter in which there is present a dispersing agent, or to which a suitable dispersing agent has been added, if emulsified with water or other suitable liquid and then spray-dried as herein taught, will produce a dry powder having the described reverse phase characteristics.

We claim:

1. A chocolate product comprising hydrophilic chocolate powder that is stable at all atmospheric temperatures, easily dispersible in water and decomposes without melting at temperatures not less than 300° F.

2. A chocolate powder comprising substantially natural chocolate liquid particles which are readily dispersible in water, non-greasy in appearance and in the form of a matrix of the fibrous material with the fatty constituent substantially enclosed by said fibrous material matrix.

3. A chocolate powder comprising the constituents of natural chocolate liquor arranged with the cocoa fibre forming a matrix and the fat in the form of globules not greater than about 10 microns in diameter substantially enclosed within said matrix and protected thereby from external temperature influence.

4. A chocolate product comprising readily wettable and substantially non-hygroscopic chocolate powder in the form of separate globular particles comprising an arrangement of the natural chocolate liquor constituents in which the fatty ingredient is entrained as globules substantially colloidal in size in the fibrous ingredients.

5. As a new article of manufacture, an edible product in the form of separate particles of a high fat content, natural vegetable unit, in which the fibrous ingredient of the original vegetable unit is arranged largely at the surface and the fatty ingredient thereof is arranged in the form of globules microscopic in size largely at the center of each particle.

6. As a new article of manufacture, an edible product in the form of separate particles of a high fat content nut, in which the fibrous ingredient of the original nut is arranged largely at the surface and the fatty ingredient thereof is arranged in the form of globules microscopic in size largely at the center of each particle.

7. As a new article of manufacture, an edible product in the form of separate particles of a high fat content seed, in which the fibrous ingredient of the original seed is arranged largely at the surface and the fatty ingredient thereof is arranged in the form of globules microscopic in size largely at the center of each particle.

8. The method of converting chocolate liquor containing cocoa butter and fiber into altered physical form, which comprises mixing said chocolate liquor with water at a temperature at or above the melting point of the cocoa butter, forming a substantially stable emulsion of the mixture, finely subdividing the emulsion, and drying the individual particles so formed to remove the previously added water therefrom.

9. The method of producing a relatively high fat-content fibrous vegetable material in dry, finely-divided form, which comprises mixing the material with water at a temperature at or above the melting point of the fat, forming a substantially stable emulsion of the mixture, and spray-drying the emulsion to remove the previously added water from the sprayed particles.

10. The method of converting a relatively high fat-content, fibrous, water-insoluble, vegetable material, into a granular product in which the fat and fibre are physically rearranged from their normal positions, which comprises subjecting the material to high-speed mechanical dispersion in water, whereby a fine dispersion of the insoluble fat and fibre in the water is obtained, atomizing the resulting slurry while the insolubles are so dispersed, and drying the atomized slurry to obtain the granular product.

PAUL T. ZIZINIA.
THOMAS L. McKENNA.

CERTIFICATE OF CORRECTION.

Patent No. 2,201,820.                                          May 21, 1940.

PAUL T. ZIZINIA, ET AL.

It is hereby certified that error appears in the printed specification of the above numbered patent requiring correction as follows: Page 2, second column, line 75, for the word "coating" read --coacting--; page 3, first column, line 63, claim 2, for "liquid" read --liquor--; and that the said Letters Patent should be read with this correction therein that the same may conform to the record of the case in the Patent Office.

Signed and sealed this 18th day of June, A. D. 1940.

(Seal)

Henry Van Arsdale,
Acting Commissioner of Patents.